Oct. 24, 1939.          C. SAUZEDDE          2,176,927
HYDROSTATIC BRAKE
Filed Jan. 13, 1936

INVENTOR
Claude Sauzedde

BY

ATTORNEYS

Patented Oct. 24, 1939

2,176,927

UNITED STATES PATENT OFFICE 2,176,927

HYDROSTATIC BRAKE

Claude Sauzedde, Detroit, Mich., assignor to Detroit Hydrostatic Brake Corporation, Detroit, Mich., a corporation of Michigan Application January 13, 1936, Serial No. 58,791

10 Claims. (Cl. 188—152)

The present invention relates to hydrostatic brakes having shoes of sectional segmental form with dual conical faces adapted for wedging engagement with dual angularly disposed annular contacting surfaces of a brake drum.

The primary object of the present invention is to provide a hydrostatic brake structure wherein the shoe supporting and actuating means is particularly adapted to withstand, without distortion, the crushing and torsional stresses set up when the brake shoes are forced into contact with the braking surfaces of the drum. By way of example a preferred embodiment is disclosed wherein this object is attained by the provision of a brake shoe supporting spider having diametrically opposed co-axial guides supporting a pair of brake shoes of segmental form for radial movement with respect to a brake drum, the shoes being supported intermediate their ends by means which is slidably received in the guides on the spider. The guides serve to support the brake shoes in proper relation for braking engagement with the brake drum and resist the torsional stresses set up when the shoes are moved into engagement with the drum. The fluid pressure brake shoe applying means is disposed on diametrically opposite sides of the spider and between the ends of the brake shoes so that in addition to moving the shoes into braking engagement with the drum surfaces they serve to reinforce the shoe guiding means and to relieve it of a part of the torsional stress resulting from brake application.

Another object of the present invention is to provide a hydrostatic brake having segmental shoes with dual conical faces for engagement with conical brake drum surfaces, means for supporting and guiding said shoes with respect to the drum whereby they may be moved into and out of engagement with the drum, and fluid pressure actuating means for moving said brakes into engagement with the drum whereby torsional stresses set up by engagement of the shoes with the drum are uniformly distributed throughout the guides and the fluid pressure means.

This object is accomplished as will hereinafter appear by supporting the shoes intermediate their ends in the guides and by applying the actuating pressure to the shoes at the ends thereof, remote from the guides. This mode of applying the pressure has the added advantage that the entire brake shoe surface engages the drum under uniform pressure and the pressure which causes this engagement torsionally resists the heavy friction present during brake engagement which ordinarily tends to carry the entire brake formation with the rotating braking surface.

Another object of the present invention is to provide a hydrostatic brake embodying a plurality of segmental type shoes with fluid pressure means for causing engagement of the shoes with the brake drum, the fluid pressure means comprising expansible units disposed between the adjacent ends of the shoes so that when fluid under pressure is supplied thereto the pressure is uniformly distributed to the shoes, regardless of variations in the actual length of travel of the shoes from their retracted position to a position of engagement, which length of travel might vary due to uneven wear on the shoes.

With the above and other ends in view the invention is more fully disclosed with reference to the accompanying drawing, wherein—

Like characters of reference are employed throughout to designated corresponding parts.

Figures 1, 2:
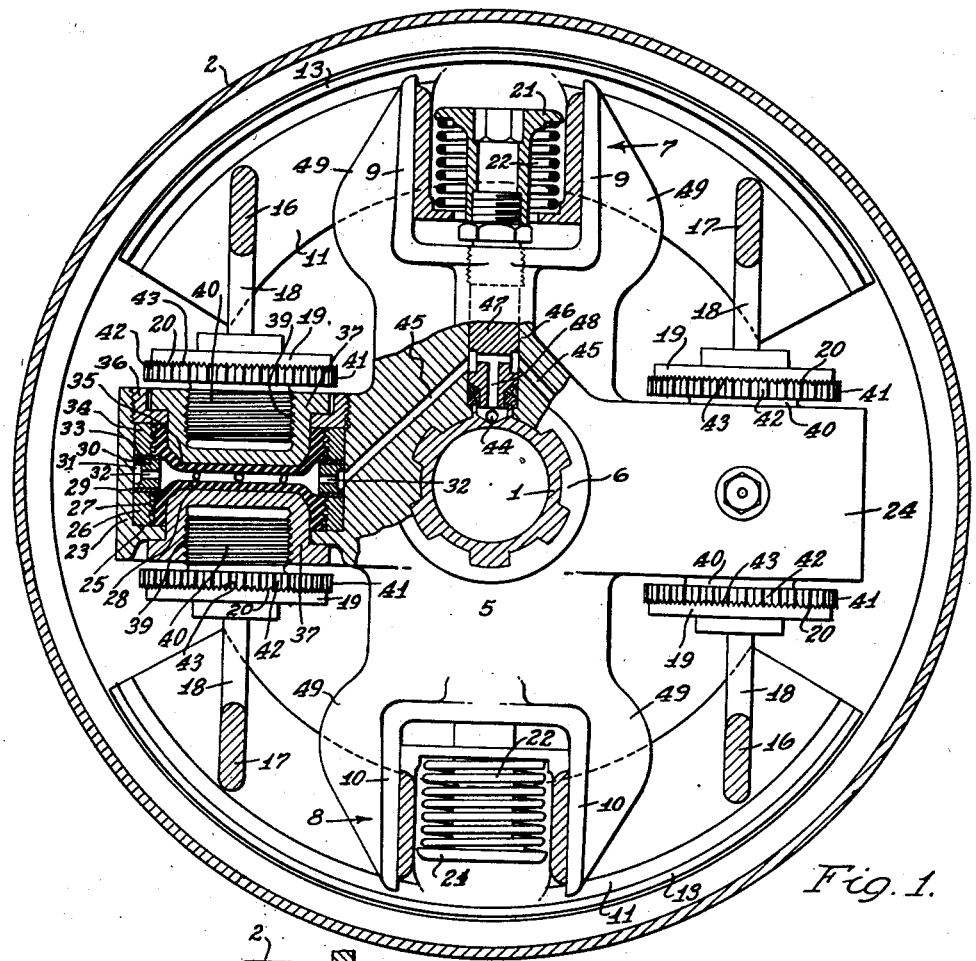
Figure 1 is a vertical section of the brake.
Fig. 2 is a fragmentary section of a detail.

Referring to Fig. 1 the numeral 1 designates an externally splined axle spindle and 2 a brake drum concentric therewith, the brake drum having braking surfaces 3 and 4 disposed obliquely to the axis thereof and opposed one to the other. As is well known in the art the axle spindle 1 is stationary and the brake drum 2 is rotatable with respect thereto, the latter being adapted to be attached to a wheel in the usual manner. On the spindle 1 is provided a spider 5 having a hub portion 6 internally splined to fit the splines on the spindle 1. A pair of guides 7 and 8 is provided on diametrically opposite sides of the hub 6, each guide comprising a pair of spaced apart arms 9 and 10 respectively. The arms 9 of the guide 7 and the arms 10 of the guide 8 extend parallel to a diametric line passing centrally therebetween and through the axis of the hub 6.

A pair of brake shoes is provided and each shoe consists of obliquely disposed side members 11 and 12 with brake lining material 13 on the outer conical faces thereof. The two side members 11 and 12 are united intermediate their ends by a central uniting body 14 having a portion 15 extending inwardly radially with respect to the side members 11 and 12. The side members 11 and 12 are united adjacent one end by a transverse web 16 and at the other end by a web 17, the webs 16 and 17 being rigid whereby they maintain the ends of the shoes in definitely spaced apart relation. Extending from each web 16 and 17 is a stem 18 provided at its end with a head 19. The face 20 of head 19 is provided with a series of radially extending ratchet-like grooves or corrugations, these corrugations being illustrated in the drawing in a greatly exaggerated manner. Actually the corrugations approximate a few thousandths of an inch.

As illustrated in Fig. 1 the shoes are disposed within the drum 2 with the uniting body 14 and its radial extension 15 slidable between the arms 9 of the guide 7 or between the arms 10 of the guide 8, as the case may be. In each guide 7 and 8 there is provided a spring retainer 21, and a spring 22 is compressed between the retainer 21 and the uniting portion 15 of respective shoes so that the springs 22 normally move the shoes inwardly radially so as to be out of engagement with the surfaces 3 and 4.

The spider 5 has a pair of cylindrical chambers 23 and 24 formed on diametrically opposite sides of the hub 6 and symmetrically spaced with respect to each other and the guides 7 and 8. Inasmuch as the structure enclosed in each of the chambers 23 and 24 is identical, only that in the chamber 23 is illustrated and described in detail. The chamber 23 has an internal shoulder 25 upon which is seated an annular metallic member 26 having serrations 27 in the inner surface thereof and an elastic diaphragm 28 vulcanized thereto. Resting upon the top of the annular member 26 is an aluminum seal 29, also of annular form. A ring 30 having a peripheral groove 31 and a series of ports 32 extending from the groove radially through the ring is placed upon the aluminum seal 29. Resting on the ring 30 is an aluminum seal 33 of annular form and engaged by an annular member 34, similar to the annular member 26, and having an elastic diaphragm 35 vulcanized thereto. The annular member 34, seal 33, ring 30, seal 29 and annular member 26 are all tightly clamped together by a retainer 36 which is screwed into the end of the cylindrical chamber 23. It will be noted, however, that the elastic diaphragms 28 and 35 are not subjected to any pressures which might tend to loosen them from their respective metallic parts 26 and 34.

Received in each of the diaphragms 28 and 35 is a piston 37, each piston being internally threaded at 39 to receive a screwthreaded stem 40 having a head 41 on the outer end thereof. Each head 41 is provided with a series of notches 42 around the periphery thereof and with a series of ratchet-like notches or corrugations 43 on the face thereof to cooperate with the similar notches or corrugations 20 on the respective head 19. Upon reference to Fig. 1 it will be seen that each one of the heads 19 rests upon one of the heads 41.

The axle spindle 1 is provided with a passage 44 adapted to convey fluid, and the spider 5 is provided with a pair of passages 45 extending from the chambers 23 and 24 to a central bore 46 wherein there is provided a plug 47 having passages 48 for conveying fluid from the passage 44 to both passages 45.

Upon reference to Fig. 1 it will be seen that reinforcing webs 49 extend from the guide arms 9 and 10 to the cylindrical chambers 23 and 24 so that the guides and chambers mutually reinforce each other.

With the device in the position illustrated the springs 22 tend to move the shoes inwardly radially and to force the diaphragms 28 and 35 toward each other in the event that no liquid is present between the diaphragms. The pistons 37 move inwardly until their flanged ends engage positive movement limiting means which, with one of the pistons, is the sealing element 36, and with the other piston, is the bottom face of the shoulder 25. Such movement limiting means, although illustrated herein, is not essential to the operation because the spacing ring 30 with its ports 32 permits the fluid to be forced between the diaphragms 28 and 35 even though they are in face to face contact. It is contemplated, in some cases, that the two diaphragms will be in face to face contact when the brakes are fully retracted. Upon introduction of fluid under pressure into the passage 44 such fluid is conveyed through the passages 45 into the grooves 31 in the rings 30 and through the apertures 32 between the diaphragms 28 and 35, causing the latter to be forced apart. By forcing the diaphragms 28 and 35 apart the pistons 37 are likewise moved apart and press the shoes into engagement with the brake surfaces 3 and 4. It will thus be seen that the heads 19 and 41 are always under pressure and that the cooperating ratchet faces thereon tend to prevent rotation of the stems 40 in the screwthreaded portions 39 of the pistons. However, by applying rotative pressure to any of the heads 41 by engaging a suitable implement in the peripheral notches thereof the stems 40 may be rotated and screwed into or out of their respective pistons for the purposes of adjustment.

Although a specific embodiment of the invention has been illustrated and described it will be understood that various changes may be made within the scope of the appended claims without departing from the spirit of the invention and such changes are contemplated.

What I claim is:

1. Supporting means for hydrostatic wheel braking mechanisms comprising a spider, said spider having a centrally disposed hub part, brake shoe guide members integral with said hub, said guide members being disposed with their axes coincident with a diametric line extending through said hub, said guides being open at their sides, and a pair of cylindrical chambers formed on diametrically opposite sides of said hub in equally spaced relation to said guides and disposed with their axes parallel to said diametric line.

2. Supporting means for hydrostatic wheel braking mechanisms comprising a cross-shaped spider, said spider having a centrally disposed hub portion, brake shoe guide members integral with said hub portion and disposed in opposed portions of the cross formation, said guide members being disposed with their axes coincident with a diametric line extending through said hub, cylindrical chambers formed in the other cross portions of said spider and symmetrically spaced with respect to said guides, said chambers being disposed with their axes parallel to said diametric line and interconnected fluid conveying means extending through said spider to each of said cylindrical chambers.

3. Supporting means for hydrostatic wheel braking mechanisms comprising a cross-shaped spider, said spider having a centrally disposed hub part integral with the cross portions, brake shoe guide members in opposed cross portions, said guide members being disposed with their axes coincident with a diametric line extending through said hub, a pair of cylindrical chambers formed in the other cross portions in equally spaced relation to said guides and disposed with their axes parallel to said diametric line, and web connections between the cross portions having said guides and the cross portion having said cylindrical chambers and mutually bracing the same.

4. Supporting means for hydrostatic wheel braking mechanisms comprising a cross-shaped spider, said spider having a centrally disposed hub portion adapted for the reception of supporting means, guide members in opposed cross portions of said spider, each guide comprising a pair of arms projecting from the hub with each pair having its arms parallel to a line extending diametrically through said hub, a pair of cylindrical chambers formed in the other cross portions of said spider and equally spaced from said guides and disposed with their axes parallel to said diametric line, and web connections between the cross portions having said guides and the adjacent cross portions having said cylindrical chambers and mutually bracing the same.

5. In a hydrostatic wheel braking mechanism, a rotatable drum, a stationary support, a plurality of brake shoe members, cooperating means on said stationary support and brake shoe members supporting said shoe members, said means including elements for guiding said shoe members radially of the drum and for preventing angular movement of the shoe members about their axes of movement while said shoe members remain substantially unsecured against movement in the direction of the axis of said drum, yieldable means normally urging said shoes inwardly with respect to said drum, and hydrostatically expansible means between the ends of said shoes for moving them outwardly with respect to said drum.

6. In a hydrostatic wheel braking mechanism, a rotatable drum having a pair of opposed braking surfaces extending obliquely to the axis of rotation thereof, a spider stationary with respect to said drum, a plurality of brake shoes having opposed braking surfaces extending at an oblique angle corresponding to the braking surfaces on said drum, guide means on said spider supporting said brake shoes for movement and for guiding such movement radially into and out of engagement with said drum braking surfaces with said shoes substantially unsecured against movement in the direction of the axis of said drum, yieldable means normally retracting said shoes from engagement with said drum surfaces, and hydrostatically expansible means supported by said spider and disposed thereby between the ends of said shoes for moving said shoes into engagement with said drum surfaces.

7. In a hydrostatic wheel braking mechanism, a rotatable drum having a pair of opposed braking surfaces extending obliquely to the axis of rotation thereof, a spider stationary with respect to said drum, a plurality of brake shoes having opposed braking surfaces extending at an oblique angle corresponding to the braking surfaces on said drum, guide means on said spider supporting said brake shoes for radial movement into and out of engagement with said drum braking surfaces with said shoes substantially unsecured against movement in the direction of the axis of said drum, yieldable means normally retracting said shoes from engagement with said drum surfaces, hydrostatically expansible means supported by said spider and disposed thereby between the ends of said shoes for moving said shoes into engagement with said drum surfaces, and means manually adjustable as to length freely connecting said hydrostatically expansible means with adjacent ends of respective shoes.

8. In a hydrostatic wheel braking mechanism, a rotatable drum, a stationary support having radial guides disposed radially with respect to said drum, segmental shoes supported by said guides and movable in said guides radially into and out of engagement with said drum, said guides comprising spaced parallel arms and said shoes being substantially unsecured against movement relative to the arms in the direction of the axis of said drum, fluid receiving members supported by said stationary support, pistons freely connected to opposite ends of said shoes and slidably received in said chambers, means for supplying fluid under pressure to said chambers, and yieldable means normally holding said shoes out of engagement with said drum.

9. In a hydrostatic wheel braking mechanism, a rotatable drum, a stationary support coaxial with said drum, a pair of diametrically opposite guides on said support, brake shoe members supported in said guides for radial movement with respect to said drum, said guides being open at their sides whereby the shoes are unsecured against movement in the direction of the axis of said drum, a pair of fluid receiving cylindrical chambers on said support disposed on diametrically opposite sides thereof, said cylindrical chambers being disposed with their axes parallel to the axes of the guides, a pair of movable elements in each chamber, means freely connecting each movable element to one end of a brake shoe, said connecting means including elements permitting relative movement between said movable elements and brake shoes, fluid conveying means opening into said chambers between the movable elements therein, and yieldable means for moving said shoes inwardly with respect to said guides.

10. Supporting means for hydrostatic wheel braking mechanisms comprising a spider, said spider having a centrally disposed hub portion adapted for reception of supporting means, guide members integral with said hub, each guide comprising a pair of arms projecting from the hub with each pair having its arms parallel to a line extending diametrically through said hub, said arms being adapted to restrict movement of brake shoes received therein to a direction radial with respect to said hub portion while the shoes remain substantially unsecured against movement in the direction of the axis of said hub portion, a pair of cylindrical chambers formed on diametrically opposite sides of said hub and equally spaced from said guides and disposed with their axes parallel to said diametric line.

CLAUDE SAUZEDDE.